March 19, 1957 A. E. SANDNESS 2,785,502
BAIT BUCKET
Filed April 23, 1954 2 Sheets-Sheet 1
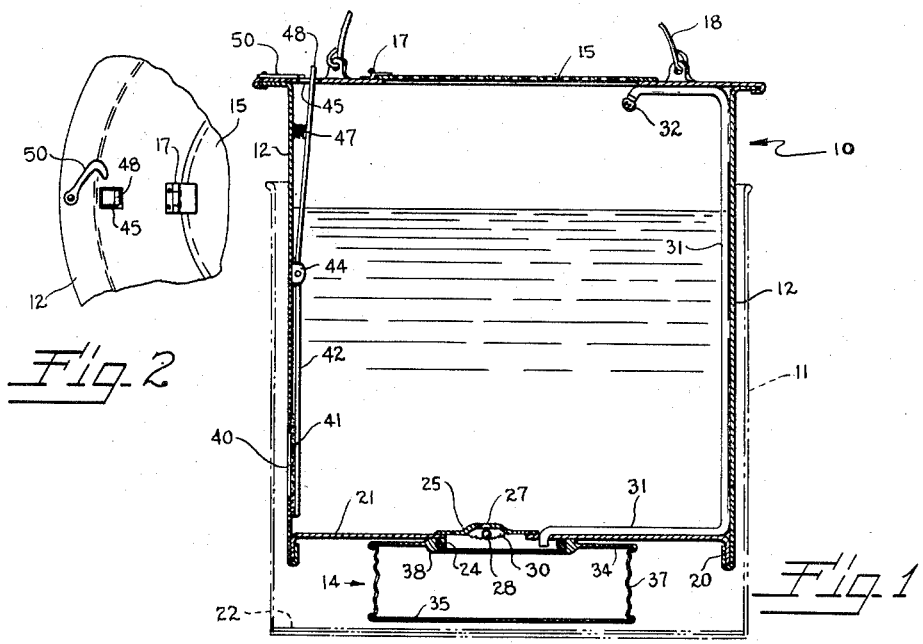
Fig. 2
Fig. 1
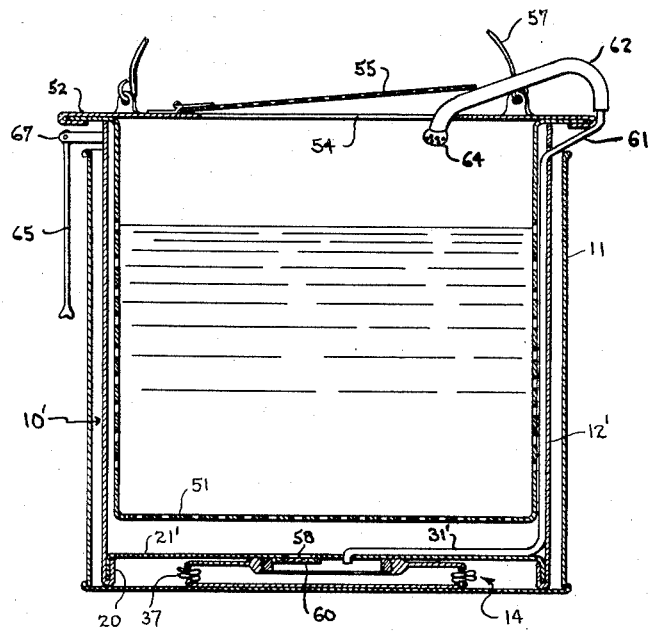
Fig. 3
INVENTOR.
ARNOLD E. SANDNESS
BY Richard von K. Brunn
Atty.

INVENTOR.
ARNOLD E. SANDNESS
BY Richard von K. Bruns
Atty.

United States Patent Office 2,785,502
Patented Mar. 19, 1957

2,785,502

BAIT BUCKET

Arnold E. Sandness, Syracuse, N. Y.

Application April 23, 1954, Serial No. 425,229

5 Claims. (Cl. 43—57)

This invention relates generally to live bait carrying apparatus, and has particular reference to an improved water aerating device for use in connection with a bait bucket or pail.

As is well-known to fishermen, it is frequently necessary to keep live bait for a considerable length of time before it can be used and in such event, if precaution is not taken, a good portion of the bait may die or become very sluggish during this interim period. The reason for this unfortunate occurrence is that the bait eventually consumes all, or nearly all, of the oxygen in the water, and when the oxygen supply is gone the bait can no longer survive.

This problem has long been recognized by fishermen and manufacturers of fishing equipment, and various structures have heretofore been devised in an attempt to provide a workable solution to the problem. Most of these structures are embodied in the usual bait bucket or pail and comprise some means to entrap a small supply of air which is thereafter permitted to bubble up through the water for the purpose of replenishing the oxygen supply. In those structures which are relatively simple and inexpensive, however, it has usually been found that the small amount of air entering the water is inadequate to replenish the oxygen consumed by the bait, while the more elaborate arrangements have in most cases proved to be too expensive or too complicated for the average fisherman to bother with.

In order to overcome the above-noted disadvantages of these prior structures, it is the primary object of this invention to provide an improved water aerating device for a bait bucket which is highly effective in operation and, at the same time, is of relatively simple and economical construction.

Another important object of the invention is to provide a water aerating device for a bait bucket wherein the water can be effectively aerated with a minimum of time and effort.

A further important object of the invention is to provide a water aerating device which may be used with most conventional types of bait buckets and thus may be purchased by the fisherman as an accessory for previously acquired equipment.

A more specific object of the invention is to provide a water aerating device for a bait bucket comprising an insert for the bucket having a collapsible container secured thereto which container is operable by means of a bellows action to alternately receive a fluid and discharge it into the bait water in such a manner that the water is thoroughly aerated.

Other objects and advantages will become apparent from the following detailed description read in conjunction with the accompanying drawings wherein like reference numbers designate like parts in all the views.

In the drawings:

Figure 1 is a vertical section through the center of one embodiment of the water aerating device of the invention;

Figure 2 is a fragmentary plan view of the device shown in Figure 1, illustrating the details of one of the latching mechanisms;

Figure 3 is a vertical section through the center of a conventional bait bucket equipped with another embodiment of the water aerating device of the invention;

Figure 4:
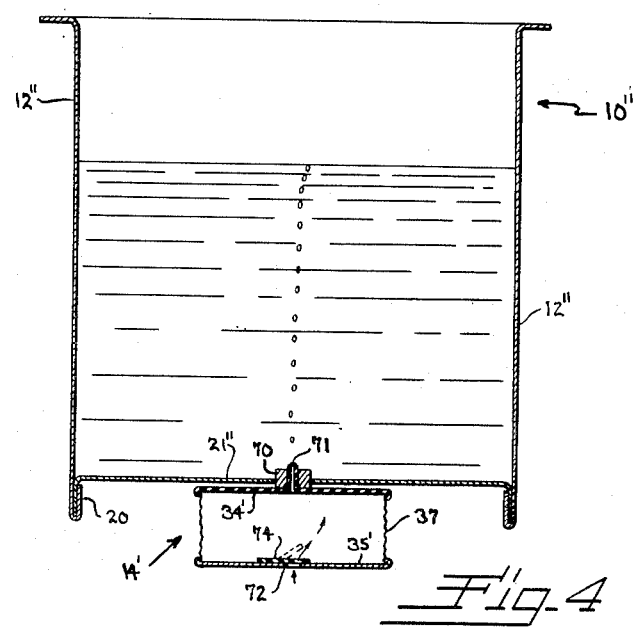
Figure 4 is a vertical section through the center of still another embodiment of the water aerating device of the invention.

Having reference now to the drawings which illustrate typical embodiments of the invention for the purpose of disclosure, and referring in particular to Figure 1, 10 generally indicates a water aerating device formed in accordance with the invention and adapted to be used in connection with the outer cylindrical casing 11 of a conventional bait bucket. The casing 11, which is shown in phantom lines, would normally be provided with the usual inner container or perforated live bait box (not shown) but the device 10 is adapted to be substituted therefor. Device 10 is essentially comprised of a substantially imperforate cylindrical insert 12 and a collapsible container 14 secured in a manner to be described to the bottom of said insert. Insert 12 is adapted to contain the water for the bait, such as minnows or the like, and is formed with a top opening normally covered by a ventilated lid 15 hinged to the top of the insert as at 17. A bail or handle 18 is also secured to the top of the insert to permit it to be raised or lowered in the casing 11, or to be separately carried if desired. The casing 11 is also provided with a suitable bail (not shown) which allows all of the parts to be carried as a complete unit.

The insert 12 is formed with a peripheral flange 20 which extends below the bottom 21 thereof to space the bottom from the bottom 22 of the casing 11 for a purpose to be explained. Centrally located on the underside of the insert bottom 21 is a threaded flange 24, and communicating with the area enclosed by this flange is a valve 25 which comprises an opening 27 through the bottom and a ball element 28 having a larger diameter than the opening. The ball element may be formed of rubber, plastic or other lightweight material and is adapted to seat against the underside of the opening, the element being retained in the close vicinity of the opening at all times by the screen member 30. Also communicating with the area enclosed by the flange 24 is one end of a conduit or tube 31 which passes through the bottom of the insert and extends upwardly along the side wall thereof, terminating in a spray nozzle 32 below the top of the insert as shown. This tube may be secured in position within the insert by some suitable means such as spot welding.

The collapsible container 14 comprises substantially rigid top and bottom members 34, 35 and an intermediate flexible side wall 37 of some pliable material such as plastic or rubber so that the container can be collapsed or expanded with an action similar to that of a bellows. While the top and bottom of the container are illustrated for the purpose of the disclosure as substantially rigid members, they can also be of pliable material, or the entire container can be in the form of a pliable bag if desired. The top 34 of the container is formed with a central opening encircled by a threaded flange 38, and this flange mates with the threaded flange 24 on the bottom of the insert so that the container can be detachably secured thereto. When the container 14 is in fully expanded condition it extends a considerable distance below the bottom of the flange 20 on the insert as shown in Figure 1, and when the container is in fully collapsed condition it fits within the space formed by the flange between the bottoms of the insert and casing 11, as shown in Figure 3.

In operation, the water aerating device 10 is positioned within the casing 11 with the flange 20 of the insert resting on the bottom 22 of the casing so that the collapsible container 14 is collapsed into the space between the insert and casing bottoms. The insert is then partially filled with water through the top opening and the minnows or other bait placed therein. When it is desired to aerate the water and thus replenish the supply of oxygen consumed by the bait, the device 10 is raised in the casing by means of the bail 18 and this causes the water in the insert to force the ball element 28 away from the opening 27 and open the valve 25. A portion of the water can then flow down into the container 14 which is free to expand due to the elevated position of the insert, Figure 1. When the container is filled with water, the device is again lowered in the casing, or allowed to settle by its own weight, and this causes the container to collapse forcing the water therefrom. However, as the container starts collapsing, the water therein forces the ball element to seat against the opening 27 and close the valve so that the water is forced out through the tube 31 and returned to the insert through the spray nozzle 32. As the water emerges from the nozzle in a spray and drops down to the water level below, it is thoroughly aerated and thus brings a new supply of oxygen to the water containing the bait. In addition, as the spray strikes the water remaining in the insert it stirs up the surface thereof sufficiently to cause further aeration at that point. The foregoing procedure can be carried out in a few minutes time and may be repeated periodically at greater or less intervals depending upon the quantity of bait, amount of water in the insert and so forth.

It should be mentioned that the device 10 of Figure 1 can be removed from the casing 11 and supported in the waters of a river or lake, if desired, in the manner of a conventional live bait box. To this end, the insert 12 is formed with a perforated area 40 in its side wall which area is normally sealed with a closure member 41 of some material such as rubber. The closure 41 is carried on the end of an arm 42 pivotally mounted at 44 on the side wall of the insert, the portion of the arm above the pivot projecting through a slot 45 in the top of the insert. The closure is normally held in sealing position by means of a spring 47 positioned between the side wall of the insert and upper portion of the arm 42, but when it is desired to anchor the device in a river or lake the upper end 48 of the arm is pulled outwardly against the action of the spring and latched with the hook 50, Figure 2, so that water can circulate through the device through the area 40 and perforated lid 15.

Referring now to Figure 3, a slightly modified form of water aerating device is shown wherein the device 10' is adapted to be used with both the outer casing 11 and usual perforated inner container 51 of a conventional bait bucket. In this form of the invention, the device 10' is positioned between the casing 11 and inner container 51, and the insert 12' is open at the top to receive the container which is supported on the upper edge of the insert by means of its top flange 52. The container 51 is formed with the usual top opening 54 having a hinged perforated lid 55. The container is also provided with a bail 57, and suitable latching means (not shown) are mounted on the insert to detachably secure it to the container so that the bail 57 can be used to lift or carry the container and water aerating device together.

The collapsible container 14 shown in Figure 3 is identical in both structure and operation to the collapsible container of Figure 1, although the valve between the insert and container is modified. As illustrated in Figure 3 this valve comprises an opening 58 in the bottom of the insert, and a flat member 60 secured to the underside of the bottom of the insert and normally adapted to cover the opening. The flap 60 is of some resilient material such as rubber or plastic so that when the aerating device is raised in the casing the water in the insert 12' and inner container 51 forces the flap away from the opening and fills the collapsible container. When the device is lowered in the casing to collapse the container 14, the water therein forces the flap back against the opening so that the water is forced out through the tube 31'. Thus, the flap valve operates in substantially the same manner as the ball valve of Figure 1.

Since the device 10' of Figure 3 is adapted to receive the usual inner container 51, the spray tube 31' must be adapted to such arrangement and, to this end, the tube is carried out through the upper portion of the insert side wall and extended a sufficient distance to clear the top flange 52 of the inner container 51 as indicated at 61. The tube is cut off just above the edge of the flange, and secured to its end as by a friction fit is a length of flexible hose or tubing 62 of some suitable material as rubber or plastic. The other end of hose 62 is provided with a spray nozzle 64, and the hose is directed through the top opening 54 of the container 51 as shown to return the aerated water to the insert as previously described. Obviously, if it is desired to remove the inner container 51 from the device 10', the hose 62 can simply be withdrawn from the opening 54 and swung out of the way. As shown in Figure 3, the aerating device 10' is provided with a support arm 65 swingably mounted on a bracket 67 projecting outwardly from the upper portion of the insert 12'. This arm is forked at its lower end so that when the device is raised in the casing to allow the collapsible container 14 to fill, the forked end can be positioned on the upper rim of the casing to support the device so that it need not be held by the fisherman. While the arm 65 is here shown in Figure 3 only it can, of course, be applied to any of the disclosed forms of the invention for the above-described purpose.

Figure 4 illustrates a further modification of the water aerating device of the invention. This form of the device is also adapted to be used with both the outer casing and inner perforated container of a conventional bait bucket, as shown in Figure 3, but provides for an air rather than a water circulating system to aerate the water. To this end, the bottom 21" of the insert 12" is provided with a plug 70 of cork, wood or the like having a bore to receive a tube 71 secured to the top 34' of the collapsible container 14'. This construction not only serves as a valve connection between the interior of the insert and collapsible container but also serves to detachably secure the parts together. The upper end of tube 71 is formed into a minute orifice of sufficiently small size to prevent any appreciable amount of water from passing from the insert into the container but large enough to permit air to travel in the opposite direction. The air, in this case, is taken into the container 14' through a flap valve 72 similar to the valve of Figure 3. This valve is located in the bottom member 35' of the container and provided with a lightweight, highly flexible flap 74 so that when the device 10" is suddenly raised in the casing, a partial vacuum is created within the container causing the surrounding air to enter through the valve. Thereafter, as in the previously described embodiments of the invention, when the device is lowered to collapse the container, the air therein forces the flap 74 over the opening to close the valve and the air escapes through the orifice in the tube 71. As this air passes into the insert it aerates the water therein, and it does so more effectively than prior air systems since the air in the disclosed arrangement is being forced into the water under a considerable amount of pressure which has not been the case heretofore.

Figure 5:
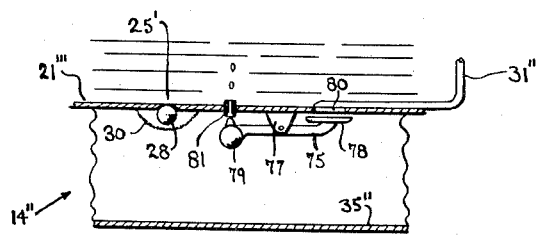
Figure 5 is a fragmentary vertical section through an embodiment of the invention, illustrating a modified valve arrangement.

Reference is now made to Figure 5 wherein a modified valve arrangement is shown which could be used with either of the forms of the invention illustrated in Figures 1 and 3. This valve arrangement provides for a combined water and air circulating system to aerate the water and operates on the principle that, as noted above, when the device 10 is suddenly raised in the casing a partial vacuum is created in the collapsible container 14". Normally, even before any appreciable amount of water can enter the container from the insert, this vacuum is occupied by air rushing in through the tube 31" and then, as the water fills the container, this air is driven back out through the tube. The modified valve arrangement of Figure 5 permits the utilization of this air which enters through the tube by providing, in addition to the ball valve 25' for the water system, a two-way valve 75 for controlling the air. Valve 75 comprises a rocker arm pivotally supported by a bracket 77 on the bottom 21''' of the insert, a valve plate 78 secured to one end of the arm, and a float element 79 having a valve plug secured to the other end of the arm. The rocker arm, plate and float are preferably of some lightweight material such as plastic, and the float is slightly heavier than the plate to normally bias it upwardly. The plate 78 is adapted to close the opening 80 in the bottom of the insert which communicates with the spray tube 31", while the float-plug 79 is adapted to close a small air escape opening 81. Thus, when the device 10 is raised in the casing and a partial vacuum is created in the collapsible container 14", air at atmospheric pressure within the tube 31" forces the plate 78 down so that the air can enter the low pressure area within the container, and this at the same time causes the plug on the float 79 to swing upwardly and close off the opening 81. However, the water from the insert soon starts filling the container and, as it does, it gradually compresses the air that has entered until the increased pressure in the container, aided by the slightly heavier float 79, causes the plate 78 to swing upwardly and close off the tube opening 80, and the float 79 to swing downwardly and uncover the opening 81. Thereafter, the rising water forces the entrapped air out of the container through the opening 81 so that the water remaining in the insert is aerated thereby. However, as the water approaches the top of the container it contacts the float 79 and lifts it up with it thereby closing the opening 81 and uncovering the opening 80. Thus, when the device is again lowered in the casing, the water confined in the container is forced out through the tube 31" and returned to the insert in the previously described manner.

From the foregoing description it will be apparent that the invention provides a highly effective, and yet simple and economical, water aerating device for use in a bait bucket. The invention may be embodied in other specific forms without departing from the spirit or essential characteristics thereof. The embodiments disclosed are therefore to be considered in all respects as illustrative and not restrictive, the scope of the invention being indicated by the appended claims.

What I claim is:

1. A water aerating device for a bait bucket comprising a substantially imperforate cylindrical insert adapted to be positioned in the bucket and contain water for the bait, said insert having an annular flange extending below the bottom thereof to space the bottom from the bottom of the bucket, a collapsible container removably secured to the bottom of said insert within the area enclosed by said flange, said container normally extending below said flange when in expanded condition and being collapsed into the space between the bottoms of the bucket and insert when the latter is positioned in the former, valve means to admit a fluid into said container when said insert is raised in the bucket thereby allowing the container to expand, and means to transfer the fluid admitted into said container to the water in the insert when the latter is thereafter lowered in the bucket causing the container to collapse.

2. A device as defined in claim 1 wherein said container is secured to said insert by means of a threaded connection.

3. A device as defined in claim 1 wherein said container is formed with a substantiallly rigid bottom and pliable side wall.

4. A device as defined in claim 1 wherein said fluid is water from said insert.

5. A water aerating device for a bait bucket comprising a substantially imperforate insert adapted to fit within the bucket and contain water for the bait, a collapsible container secured to the bottom of said insert, said container being collapsed by the insert when the latter is positioned within the bucket, valve means in the bottom of said insert to admit water from said insert into said container when the insert is raised in the bucket thereby allowing the container to expand, and a conduit extending from said container to a point above the water in said insert to transfer the water admitted into the container back into the insert when the latter is lowered in the bucket causing the container to collapse.

References Cited in the file of this patent

UNITED STATES PATENTS

| | | |
|---|---|---|
| 710,325 | Kern | Sept. 30, 1902 |
| 724,539 | Bourne | Apr. 7, 1903 |
| 1,568,730 | Gleason | Jan. 5, 1926 |
| 2,570,684 | Jackson | Oct. 9, 1951 |
| 2,587,834 | Goode | Mar. 4, 1952 |
| 2,636,308 | Demmer | Apr. 28, 1953 |
| 2,689,428 | Stosberg | Sept. 21, 1954 |